(12) United States Patent
Fujita et al.

(10) Patent No.: US 8,281,092 B2
(45) Date of Patent: Oct. 2, 2012

(54) MEMORY-MIRRORING CONTROL APPARATUS AND MEMORY-MIRRORING CONTROL METHOD

(75) Inventors: Kazuhisa Fujita, Kawasaki (JP); Kazuya Uesugi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 12/533,882

(22) Filed: Jul. 31, 2009

(65) Prior Publication Data

US 2009/0292891 A1 Nov. 26, 2009

Related U.S. Application Data

(63) Continuation of application No. PCT/JP2007/053833, filed on Feb. 28, 2007.

(51) Int. Cl.
*G06F 12/00* (2006.01)
(52) U.S. Cl. ........................................ 711/162
(58) Field of Classification Search ........................ None
See application file for complete search history.

(56) References Cited

U.S. PATENT DOCUMENTS 7,587,397 B2 * 9/2009 Shinkai .................................. 1/1
2004/0249928 A1 * 12/2004 Jacobs et al. ................... 709/223

FOREIGN PATENT DOCUMENTS

| JP | A 6-4578 | 1/1994 |
|---|---|---|
| JP | A 7-334402 | 12/1995 |
| JP | 09-054718 | 2/1997 |
| JP | A 11-312111 | 11/1999 |
| JP | 2002-049517 | 2/2002 |
| JP | A 2005-293315 | 10/2005 |
| JP | 2006-053737 | 2/2006 |

OTHER PUBLICATIONS

Oracle Corporation, Japan; "Oracle Timesten In-Memory Database." http://otn.oracke.co.jp/products/timesten; Feb. 15, 2005; English Web-site: http://a248.e.akamai.net/f/248/3214/1d/www.zones.com/images/pdf/oracle_timesten_ds.pdf , Jul. 21, 2009.
Office Action issued by the Patent Office of Japan for Japanese Patent Application No. 2009-501099, mailed Sep. 20, 2011 (with English language translation).

* cited by examiner

*Primary Examiner* — Kevin Ellis
*Assistant Examiner* — Stella Eun
(74) *Attorney, Agent, or Firm* — Fujitsu Patent Center

(57) ABSTRACT

When an update instruction for updating task data stored in a memory is transmitted through a transaction process performed by an application server, an active node apparatus generates, based on the update instruction, an update log indicating update contents of the task data stored in the memory, and then distributes, in a multicast manner, the generated update log to other standby node apparatuses each with a memory. With this, mirroring among the plurality of memories is controlled.

19 Claims, 7 Drawing Sheets

MEMORY-MIRRORING CONTROL APPARATUS AND MEMORY-MIRRORING CONTROL METHOD

CROSS-REFERENCE TO RELATED APPLICATIONS

This application is a continuation of PCT international application Ser. No. PCT/JP2007/053833 filed on Feb. 28, 2007 which designates the United States, the entire contents of which are incorporated herein by reference.

FIELD

The embodiments discussed herein are directed to a memory-mirroring control apparatus and a memory-mirroring control method for controlling data mirroring among a plurality of memories.

BACKGROUND

Conventionally, mission-critical systems typified by online systems for financial institutions and transportations are expected to achieve both "high reliability" and "high speed".

Of these two, as a technology for achieving high reliability, a database-duplexing technology is generally used, such as cluster technology and replication technology.

Figure 6:
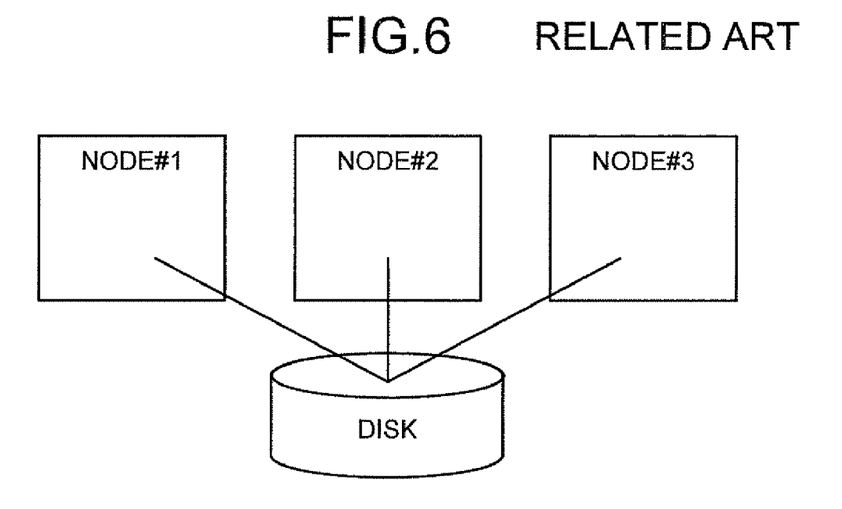
FIG. 6 is a diagram of a conventional database cluster technology.

FIG. 6 is a diagram of a conventional database cluster technology. As depicted in FIG. 6, the cluster technology is a technique of using cluster software to make a database redundant. With hardware being made in a redundant structure ("node #1", "node #2", "node #3", . . . depicted in FIG. 6), the database is made highly reliable. This technology is adopted in, for example, a social infrastructure system. In this cluster technology, data maintenance is ensured by a shared disk ("disk" depicted in FIG. 6).

Figure 7:
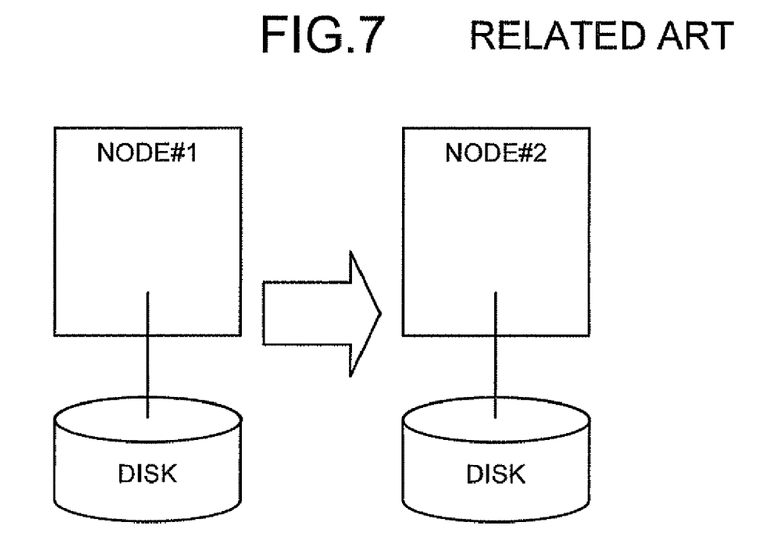
FIG. 7 is a diagram of a conventional database replication technology.

FIG. 7 is a diagram of a conventional database replication technology. As depicted in FIG. 7, the replication technology is a technique of conveying only the update result in a copy-source database ("node #1" in FIG. 7) to a copy-destination database ("node #2" in FIG. 7) for application, thereby making a replica of the database. This technology is adopted in, for example, a disaster control system. In this replication technology, File Transfer Protocol (FTP) transfer is used as a technique of transferring data to the copy destination.

On the other hand, as a technology for achieving high speed, an in-memory database has attracted attention in recent years. The in-memory database is a database that achieves an increase of the speed of accessing from an application to data and also achieves load distribution by storing data not in a disk but in a main memory (for example, refer to "Oracle TimesTen In-Memory Database" retrieved on Feb. 15, 2005 from the Internet <URL: http://otn.oracle.co.jp/products/timesten/>).

Figure 8:
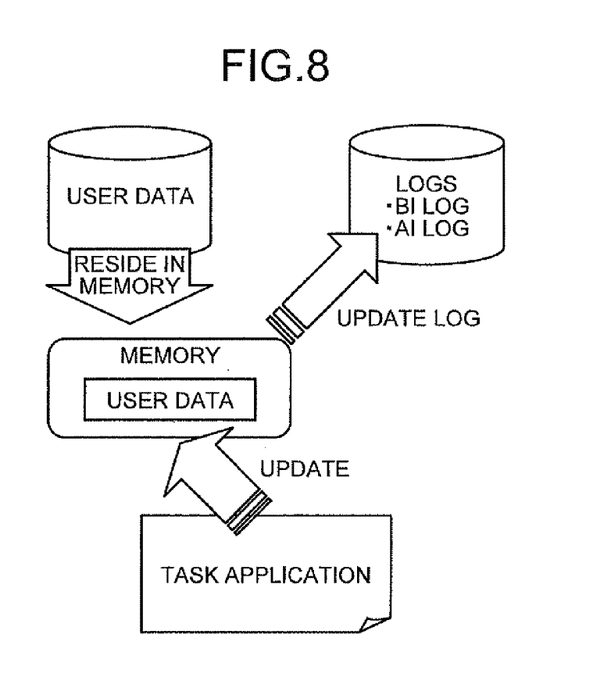
FIG. 8 is a diagram for explaining an in-memory database.

FIG. 8 is a diagram for explaining an in-memory database. As depicted in FIG. 8, in the in-memory database, user data stored in a hard disk resides in a memory. A task application updates the user data in the memory. Since an access is made onto the memory, high speed can be achieved.

In such an in-memory database, in addition to high speed, reliability as a database can be achieved by writing a log for insuring a transaction process into a disk. Such a technique of achieving reliability by using a log is used not only for the in-memory database but also for a conventional database with a disk as a storage medium. Examples of a log for use in this technique generally include a Before Image (BI) log and an After Image (AI) log.

The BI log is a log retaining the contents of the database before update, and is used mainly at the time of rolling back for restoring the contents of the database to a state before updating a transaction. By contrast, the AI log is a log retaining the contents of the database after update, and is used mainly for insuring the updated contents of the database about a transaction completed at the time of down recovery.

Here, down recovery is explained. In conventional down recovery, a transaction is recognized at the time of rebooting the database after the system goes down, and whether this transaction is valid or invalid is selected depending on the state of the transaction when the system goes down.

Specifically, in the conventional down recovery, a transaction in which a commit process had not yet been completed when the system went down is taken as invalid, and a data update performed during that transaction is also taken as invalid. On the other hand, a transaction in which a commit process had been completed when the system went down is taken as valid, and a data update performed during that transaction is also taken as valid.

Figure 9:
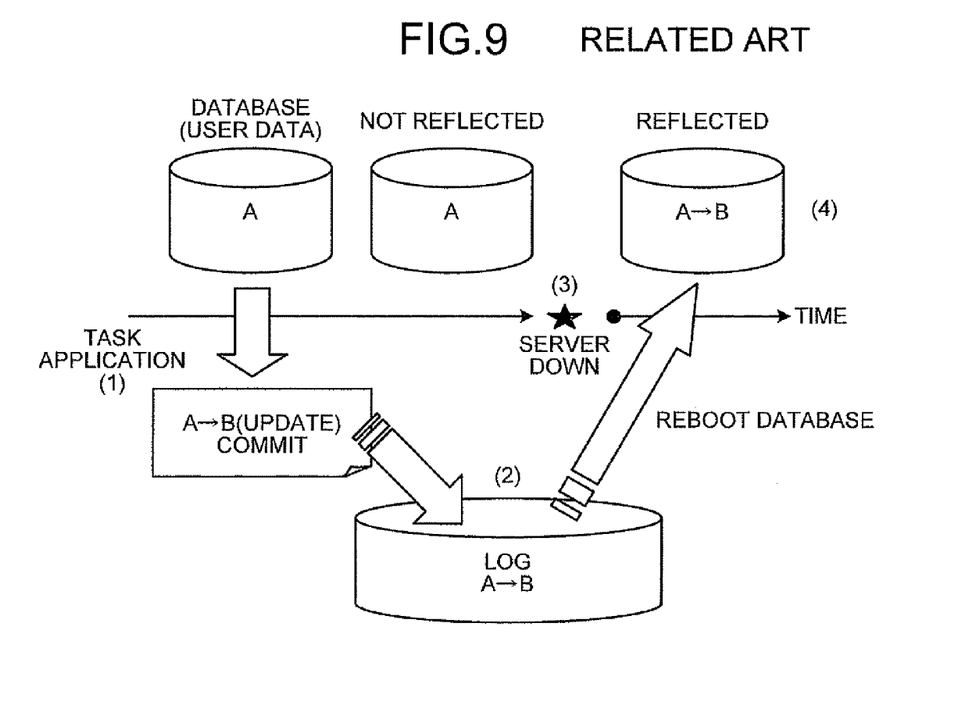
FIG. 9 is a diagram for explaining conventional database down recovery.

FIG. 9 is a diagram for explaining conventional database down recovery. For example, as depicted in (1) of FIG. 9, it is assumed that a task application performs a commit process after updating user data "A" to "B". At this time, as depicted in (2) of FIG. 9, a log indicating that the user data "A" has been updated to "B" is retained in a hard disk.

Then, as depicted in (3) of FIG. 9, it is assumed that a server goes down. In this case, when the database is rebooted, the user data in the database is restored to the latest state based on the information in the log. For example, as depicted in (4) of FIG. 9, the user data in the database is restored from "A" to "B".

As such, in the conventional technology, high speed is achieved by using an in-memory database. Furthermore, a log indicating the updated contents of data (hereinafter, referred to as "update log") is retained in a hard disk so as to allow data to be restored at the time of occurrence of a failure, thereby achieving high reliability.

In the conventional technology explained above, an update log is written in a disk so as to achieve high reliability. However, an access to the disk at the time of writing the update log disadvantageously impairs high-speed access to the database. To solve this problem, any access to the disk in the in-memory database has to be completely avoided.

However, to completely avoid any access to the disk, in place of the technology performed by using a disk for achieving high reliability, a new technology for achieving high reliability is required without using a disk. This requirement poses a serious problem for pursuing higher speed in mission-critical systems in the next generation.

SUMMARY

According to an aspect of the invention, an apparatus of controlling data mirroring among a plurality of memories includes an update-log generating unit that generates, when an update instruction for updating data stored in a predetermined memory is transmitted through a transaction process performed by an application, based on the update instruction, the update log indicating update contents of the data stored in the predetermined memory; and a memory-mirroring control unit that controls memory-mirroring among the memories by distributing, in a multicast manner, the generated update log to a plurality of other node apparatuses each with a memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the embodiments explained below are to control data mirroring among a plurality of memories in node apparatuses that each retain various task data in an in-memory database at the backend of an application server that provides a predetermined task service.

Figure 1:
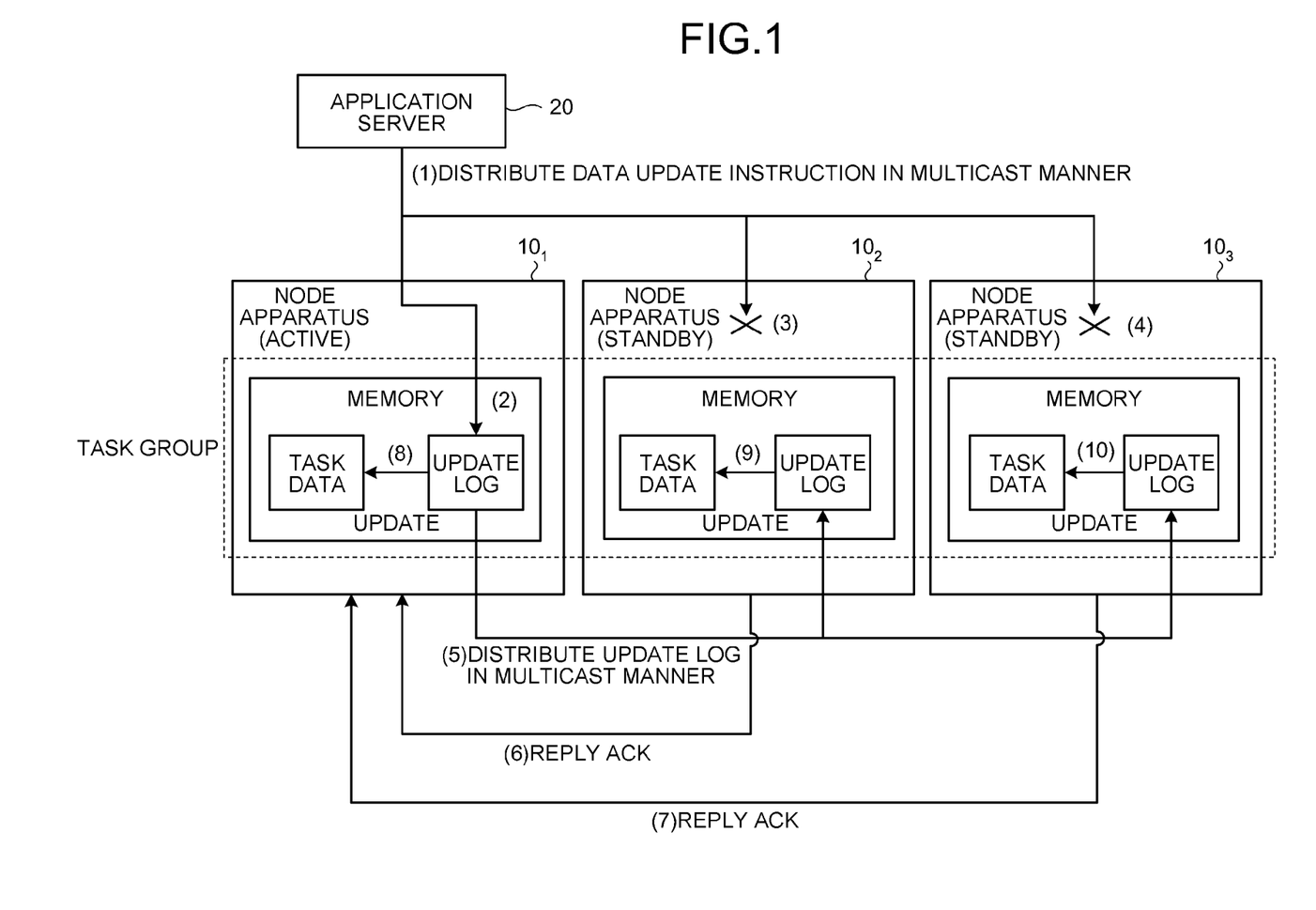
FIG. 1 is a diagram for explaining the concept of memory mirroring by node apparatuses according to an embodiment.

First, the concept of memory mirroring by node apparatuses according to the present embodiment is explained. FIG. 1 is a diagram for explaining the concept of memory mirroring by node apparatuses according to the present embodiment. As depicted in FIG. 1, node apparatuses $10_1$ to $10_3$ according to the present embodiment are set in a manner such that the node apparatus $10_1$ operates as active and the node apparatuses $10_2$ and $10_3$ operate as standbys. These node apparatuses are connected to each other via a network not depicted, and are also communicably connected to an application server 20 that performs various transaction processes by using a predetermined task application.

In this configuration, the node apparatus according to the present embodiment has a main feature such that, when an update instruction for updating task data stored in a memory is transmitted through a transaction process performed by the application server 20, the node apparatus generates, based on that update instruction, an update log indicating the updated contents of the task data stored in the memory and distributes, in a multicast manner, the generated update log to other node apparatus each with a memory, thereby controlling data mirroring among a plurality of memories.

Specifically, when an instruction for updating task data is distributed in a multicast manner through a transaction process performed by the application server 20 (refer to (1) in FIG. 1), the node apparatus $10_1$ generates, based on that update instruction, an update log indicating the updated contents of the task data, and retains the update log in its own memory (refer to (2) in FIG. 1). On the other hand, the node apparatuses $10_2$ and $10_3$ do not perform any process even when the update instruction is similarly distributed thereto, and discard the distributed update instruction (refer to (3) and (4) in FIG. 1).

Thereafter, when commit information indicating that the transaction process has been completed is transmitted from the application server 20, the node apparatus $10_1$ distributes the generated update log to other node apparatuses that belong to the same task group (here, the node apparatuses $10_2$ and $10_3$) in a multicast manner (refer to (5) in FIG. 1). The node apparatuses $10_2$ and $10_3$ receiving the update log each retain the received update log in its own memory, and reply to the node apparatus $10_1$ with an acknowledgement (ACK) response indicating that the update log has been received (refer to (6) and (7) in FIG. 1).

When a reply with an ACK response is sent from the node apparatuses $10_2$ and $10_3$, the node apparatus $10_1$ performs real updating of the task data stored in the memory based on the update log retained in the memory (refer to (8) in FIG. 1). On the other hand, the node apparatuses $10_2$ and $10_3$ performs real updating of the task data stored in their respective memories based on the update log retained in their respective memories at a predetermined timing asynchronous with the updating of the task data in the node apparatus $10_1$ (refer to (9) and (10) in FIG. 1).

With this feature, the node apparatuses $10_1$, $10_2$, and $10_3$ according to the present embodiment allow the same task data to be retained in the memories of the plurality of node apparatuses, thereby achieving high reliability of the in-memory database without using a disk.

Figure 2:
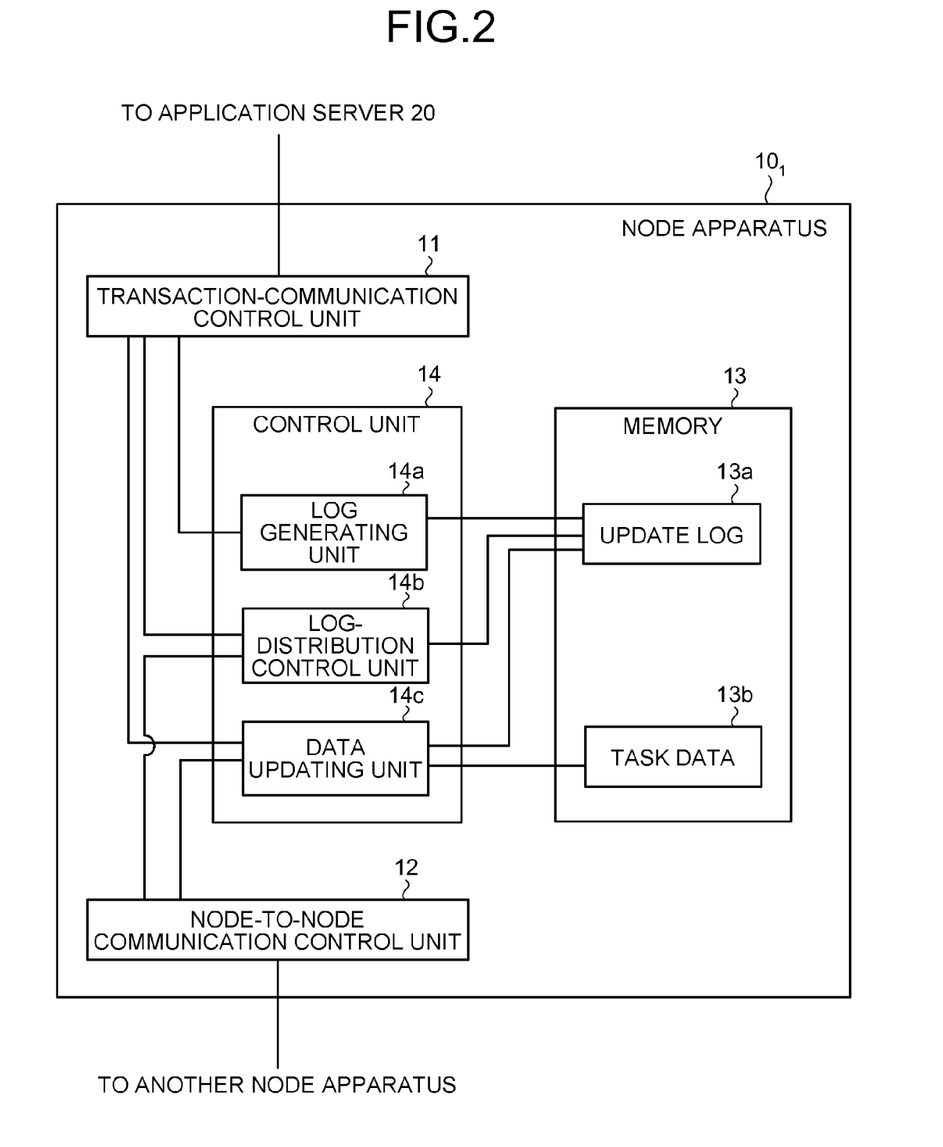
FIG. 2 is a functional block diagram of the configuration of a node apparatus according to the present embodiment.

Next, the configuration of the node apparatuses $10_1$ to $10_3$ according to the present embodiment is explained. Note that since these node apparatuses $10_1$ to $10_3$ have a similar configuration, the node apparatus $10_1$ is taken as an example for explanation. FIG. 2 is a functional block diagram of the configuration of the node apparatus $10_1$ according to the present embodiment. As depicted in FIG. 2, the node apparatus $10_1$ includes a transaction-communication control unit 11, a node-to-node communication control unit 12, a memory 13, and a control unit 14.

The transaction-communication control unit 11 is a processing unit that controls transmission and reception of data exchanged with the application server 20. Specifically, when the node apparatus $10_1$ is set as active, upon receiving a task-data update instruction distributed in a multicast manner from the application server 20, the transaction-communication control unit 11 passes the received update instruction to a log generating unit 14a, which will be explained further below.

Also, when receiving from the application server 20 commit information indicating that the transaction process has been completed, the transaction-communication control unit 11 passes the received commit information to a log-distribution control unit 14b, which will be explained further below.

Furthermore, when notified by a data updating unit 14c, which will be explained further below, that real updating of task data 13b stored in the memory 13 has been completed, the transaction-communication control unit 11 transmits to the application server 20 commit information indicating that an update of the task data has been completed.

On the other hand, when the node apparatus $10_1$ is set as standby, upon receiving a task-data update instruction from the application server 20, the transaction-communication control unit 11 discards the received update instruction, and also notifies the data updating unit 14c, which will be explained further below, that the update instruction has been received.

The node-to-node communication control unit 12 is a processing unit that controls transmission and reception of data exchanged with another node apparatus. Specifically, when the node apparatus $10_1$ is set as active, the node-to-node communication control unit 12 distributes an update log 13a passed from the log-distribution control unit 14b, which will be explained further below, to another node apparatus in a multicast manner. Also, when receiving from another node apparatus an ACK response indicating that an update log has been received, the node-to-node communication control unit 12 notifies the data updating unit 14c, which will be explained further below, that the ACK response has been received.

On the other hand, when the node apparatus $10_1$ is set as standby, upon receiving an update log distributed in a multicast manner from another node apparatus set as active, the node-to-node communication control unit 12 passes the received update log to the log-distribution control unit 14b, which will be explained further below, and also replies to the active node apparatus with an ACK response indicating that the update log has been received.

The memory 13 is a storage unit that has stored therein various data and programs, such as the update log 13a and the task data 13b, which are examples of those relating to the present invention. Here, the update log 13a is data indicating the updated contents of the task data 13b, and is generated based on the update instruction distributed by the application server 20. Also, the task data 13b includes various task data regarding task services provided by the application server 20, and is managed by an in-memory database not depicted.

The control unit 14 is a control unit that controls over the entire node apparatus $10_1$, and includes the log generating unit 14a, the log-distribution control unit 14b, and the data updating unit 14c, which are examples of those relating to the present invention.

The log generating unit 14a is a processing unit that generates the update log 13a indicating the updated contents of the task data 13b. Specifically, when the task-data update instruction is passed from the transaction-communication control unit 11, the log generating unit 14a generates the update log 13a based on that update instruction, and causes the generated update log 13a to be stored in the memory 13.

The log-distribution control unit 14b is a processing unit that distributes the update log 13a generated by the log generating unit 14a to other node apparatuses and causes an update log distributed from another node apparatus to be stored in the memory 13, thereby controlling data mirroring among the plurality of memories.

Specifically, when the node apparatus $10_1$ is set as active and commit information indicating that the transaction process has been completed is passed from the transaction-communication control unit 11, the log-distribution control unit 14b passes the update log 13a retained in the memory 13 to the node-to-node communication control unit 12, thereby distributing the update log 13a to other node apparatuses in a multicast manner.

Note that when an abnormality is detected in the transaction process before commit information is transmitted, the log-distribution control unit 14b discards the update log 13a retained in the memory 13. With this, an update of the task data 13b by the transaction process where an abnormality has occurred can be controlled so that the task data of other node apparatuses does not reflect this update.

On the other hand, when the node apparatus $10_1$ is set as standby and an update log is passed from the node-to-node communication control unit 12, the log-distribution control unit 14b causes this update log to be stored in the memory 13.

The data updating unit 14c is a processing unit that performs real updating of the task data 13b based on the update log 13a retained in the memory 13 and asynchronously with the updating of the task data in each of the other node apparatuses.

Specifically, when the node apparatus $10_1$ is set as active, upon being notified by the node-to-node communication control unit 12 that ACK responses have been received from all node apparatuses with an update log distributed thereto from the log-distribution control unit 14b, the data updating unit 14c performs real updating of the task data 13b based on the update log 13a retained in the memory 13. Then, after the real updating of the task data 13b is completed, the data updating unit 14c notifies the transaction-communication control unit 11 of commit information indicating that the update of the task data has been completed, thereby transmitting the commit information to the application server 20.

On the other hand, when the node apparatus $10_1$ is set as standby, upon being notified by the transaction-communication control unit 11 that a task-data update instruction has been received, the data updating unit 14c performs real updating of the task data 13b based on the update log 13a retained in the memory 13.

As such, the update of the task data performed in the node apparatus set as active and the update of the task data performed in the node apparatus set as standby are performed asynchronously.

Figure 3:
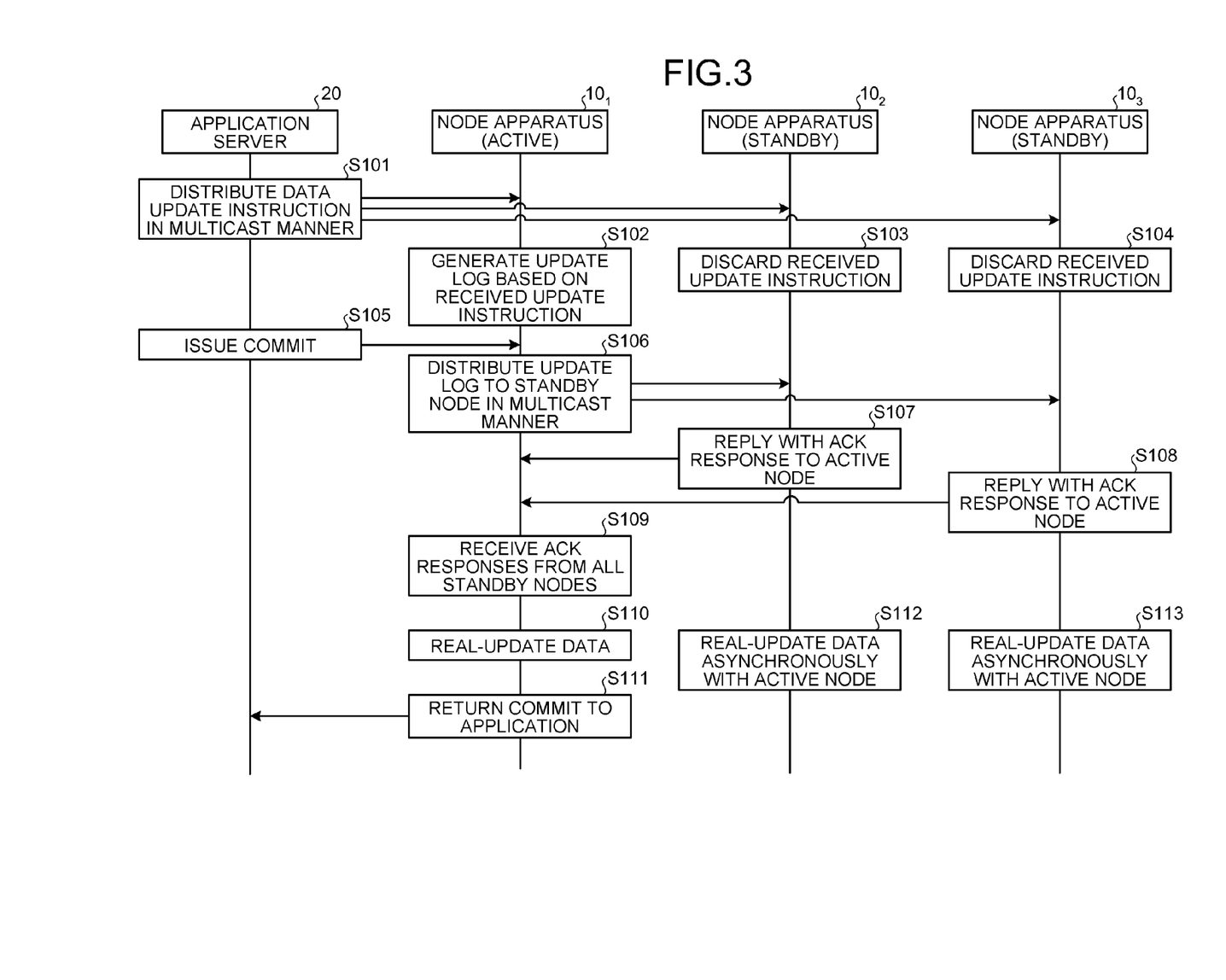
FIG. 3 is a flowchart of the process procedure of the node apparatuses according to the present embodiment.

Next, the process procedure of the node apparatus according to the present embodiment is explained. FIG. 3 is a flowchart of the process procedure of the node apparatuses according to the embodiment. In FIG. 3, the process procedure of each of the node apparatuses $10_1$ to $10_3$ depicted in FIG. 1 is depicted, and it is assumed that the node apparatus $10_1$ is set as a node apparatus as active (hereinafter, referred to as an "active node") and the node apparatuses $10_2$ and $10_3$ as node apparatuses as standby (hereinafter, referred to as "standby nodes").

As depicted in FIG. 3, when a task-data update instruction is first distributed from the application server 20 in a multicast manner (Step S101), in the node apparatus $10_1$, the transaction-communication control unit 11 receives the distributed update instruction, and the log generating unit 14a generates the update log 13a based on the update instruction (Step S102).

On the other hand, in the node apparatuses $10_2$ and $10_3$, each transaction-communication control unit receives the distributed update instruction, and discards the received update instruction (Steps S103 and S104).

Thereafter, when commit information (COMMIT) is transmitted (issued) from the application server 20 (Step S105), in the node apparatus $10_1$, the transaction-communication control unit 11 receives the transmitted commit information, and the log-distribution control unit 14b distributes the update log 13a to the standby nodes (the node apparatuses $10_2$ and $10_3$) in a multicast manner (Step S106).

When the update log 13a is distributed, in the node apparatuses $10_2$ and $10_3$, each node-to-node communication control unit receives the update log 13a, and replies with an ACK response to the active node (the node apparatus $10_1$) (Steps S107 and S108).

Then, when a reply with an ACK response is sent from all standby node apparatuses, in the node apparatus $10_1$, the node-to-node communication control unit 12 receives the respective ACK responses (Step S109), the data updating unit 14c performs real updating of the task data 13b retained in the memory 13 (Step S110), and the transaction-communication control unit 11 transmits (returns) commit information (COMMIT) to the application server 20 (Step S111).

Then, in the node apparatuses 10₂ and 10₃, each data updating unit 14*c* performs real updating of the task data retained in its own memory asynchronously with the update of the task data in the node apparatus 10₁ (active node) explained above (Steps S112 and S113).

As explained above, in the present embodiment, when an update instruction for updating the task data stored in the memory is transmitted through a transaction process performed by the application server 20, the log generating unit 14*a* generates, based on this update instruction, the update log 13*a* indicating the updated contents of the task data 13*b* stored in the memory 13, and the log-distribution control unit 14*b* then distributes the generated update log 13*a* to other node apparatuses each with a memory in a multicast manner, thereby controlling task-data mirroring among the plurality of memories. Therefore, the same task data can be retained in the plurality of memories, thereby achieving high reliability of the in-memory database without using a disk.

Also, in the present embodiment, the data updating unit 14*c* performs, based on the generated update log 13*a*, real updating of the task data 13*b* stored in the memory 13 asynchronously with the update of the task data performed in other node apparatuses based on the distributed update log 13*a*. Therefore, mirroring among the memories can be performed without affecting a response to the transaction process performed by the application server 20.

Furthermore, in the present embodiment, when a reply with an ACK response indicating that the update log 13*a* has been received is sent from all node apparatuses to which the update log 13*a* has been distributed, the data updating unit 14*c* performs, based on the generated update log 13*a*, real updating of the task data 13*b* stored in the memory 13. Therefore, after it is confirmed that the update log 13*a* has reached all node apparatuses, the task data 13*b* stored in the memory 13 can be updated. With this, reliability of the in-memory database can be further increased.

Still further, in the present embodiment, when commit information indicating that the transaction process has been completed is sent from the application server 20, the log-distribution control unit 14*b* distributes the update log 13*a* to other node apparatuses in a multicast manner. When an abnormality is detected in the transaction process before the commit information is transmitted, the update log is discarded. Therefore, mirroring among the memories can be performed only when the transaction process normally ends, thereby minimizing a range of influence when an abnormality occurs in the transaction process.

Still further, in the present embodiment, the log-distribution control unit 14*b* causes the update log distributed from other node apparatuses in a multicast manner to be stored in the memory 13. Also, when a task-data update instruction is distributed in a multicast manner through a transaction process by the application server 20, the task data 13*b* stored in the memory 13 is subjected to real updating based on the stored update log. Therefore, by using the update instruction distributed in a multicast manner from the application server 20, the update of the task data in each node apparatus can be controlled, thereby efficiently mirroring among the memories.

Still further, according to the present embodiment, the log-distribution control unit 14*b* causes the update log distributed from other node apparatuses in a multicast manner to be stored in the memory 13. Also, when the update log is received, the task data 13*b* stored in the memory 13 is subjected to real updating based on the update log already stored at the time of receiving the update log. Therefore, by using the update log distributed in a multicast manner from other node apparatuses, the data update in each node apparatus can be controlled, thereby efficiently mirroring among the memories.

Here, the case has been explained in the present embodiment in which, when the node apparatus 10₁ is set as standby, the data updating unit 14*c* updates the task data 13*b* upon the update instruction distributed in a multicast manner from the application server 20. However, this is not meant to restrict the present invention.

For example, when receiving an update log distributed in a multicast manner from another node apparatus set as active, the node-to-node communication control unit 12 may notify the data updating unit 14*c* that the update log has been received. When accepting the notification, the data updating unit 14*c* may perform real updating of the task data 13*b* based on the update log 13*a* already retained in the memory 13 at the time of acceptance.

With this, by using the update log distributed in a multicast manner, the data update in each node apparatus can be controlled, thereby efficiently mirroring among the memories.

Still further, while the case of the node apparatus for memory mirroring has been explained in the present embodiment, a memory-mirroring program having functions similar to those of the node apparatus can be obtained by achieving the structure of the node apparatus with software. Here, a computer that executes such a memory-mirroring program is explained below.

Figure 4:
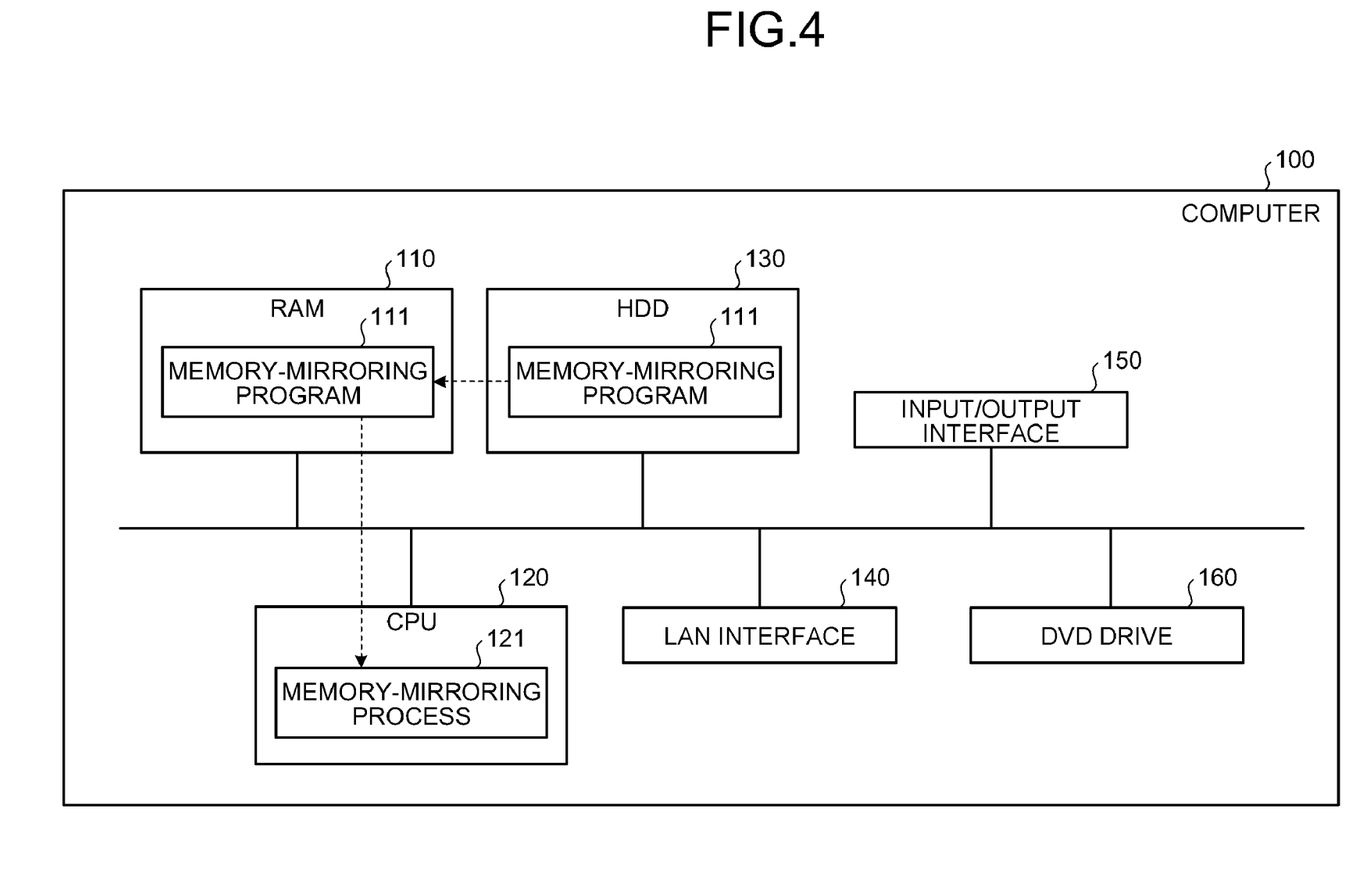
FIG. 4 is a functional block diagram of the configuration of a computer that executes a memory-mirroring program according to the present embodiment.

FIG. 4 is a functional block diagram of the configuration of a computer that executes a memory-mirroring program according to the present embodiment. As depicted in FIG. 4, a computer 100 includes a Random Access Memory (RAM) 110, a Central Processing Unit (CPU) 120, a Hard Disk Drive (HDD) 130, a Local Area Network (LAN) interface 140, an input/output interface 150, and a Digital Versatile Disk (DVD) drive 160.

The RAM 110 is a memory that has stored therein programs and execution progress results of these programs and others. The RAM 110 corresponds to the memory 13 depicted in FIG. 2, and also has stored therein the update log 13*a* and the task data 13*b*, for example. The CPU 120 is a central processing unit that reads a program from the RAM 110 for execution.

The HDD 130 is a disk device that has programs and data stored therein. The LAN interface 140 is an interface for connecting the computer 100 to another computer via a LAN, connecting the computer 100 that operates as a node apparatus to the application server 20 and another node apparatus.

The input/output interface 150 is an interface for connecting an input device, such as a mouse and keyboard, and a display device. The DVD drive 160 is a device that reads from and writes in a DVD.

A memory-mirroring program 111 executed on this computer 100 is stored in a DVD, and is read from the DVD by the DVD drive 160 to be installed on the computer 100.

Alternatively, the memory-mirroring program 111 is stored, for example, in a database in another computer system connected via the LAN interface 140, and is read from this database to be installed on the computer 100.

The installed memory-mirroring program 111 is then stored in the HDD 130, is read onto the RAM 110, and is then executed by the CPU 120 as a memory-mirroring process 121.

Still further, for convenience of explanation, the case has been explained in the present embodiment in which two node apparatuses are set as standby. However, this is not meant to restrict the present invention. Alternatively, only one node apparatuses may be set as standby, or three or more node apparatuses may be set as such. That is, in the present embodiment, depending on reliability requirements, a plurality of node apparatuses can be set as standby, thereby performing database redundancy.

In the node apparatus set as standby, the task data having the same contents as that of the node apparatus set as active is retained. Therefore, even when the task data of the active node apparatus may not be referred to due to a network failure or the like, the task data can be checked by referring to the database in the standby node apparatus.

Still further, in the node apparatus according to the present embodiment, when a failure occurs, a predetermined recovery processing unit can be used to perform recovery as follows.

First, when a failure occurs in the active node apparatus, the recovery processing unit stops the active node apparatus, and also newly sets any one of the standby node apparatuses as active. At this time, the recovery processing unit sets the node apparatus newly set as active in a manner such that the update log is not distributed to the node apparatus where the failure has occurred. Specifically, from multicast addresses serving as a reference for distribution of the update log by the node-to-node communication control unit 12, the recovery processing unit excludes the address of the node apparatus where a failure has occurred.

Subsequently, with reference to the memory of the node apparatus newly set as active and the memory of other standby node apparatus(es), the recovery processing unit checks the state of reflecting the update log onto the task data. When it is confirmed that the update log has been correctly reflected on all node apparatuses, the recovery processing unit transmits, from the node apparatus newly set as active to the application server 20, commit information indicating that the updating the task data has been completed.

Here, if there is a node apparatus where the update log is not correctly reflected on the task data, the recovery processing unit rolls back the task data where the update log has already been reflected, thereby insuring consistency of the task data in the memory. Then, upon completion of the series of recovery processes, the recovery processing unit uses the node apparatus newly set as active to restart the task.

On the other hand, when a failure occurs in any standby node apparatus, the recovery processing unit stops that standby node apparatus, and sets the active node apparatus so that it does not distribute the update log to the node apparatus where the failure has occurred. Specifically, from the multicast addresses serving as a reference for distribution of the update log by the node-to-node communication control unit 12, the recovery processing unit excludes the address of the node apparatus where a failure has occurred.

Even while the recovery processing unit is performing a recovery process, the active node apparatus continuously operates. Therefore, when a failure occurs in any standby node apparatus, the transaction process by the application server 20, that is, the task service provided by the application server 20 is not affected by the recovery process.

Still further, among the processes explained in the present embodiment, all or part of the processes explained as being automatically performed can be manually performed, or all or part of the processes explained as being manually performed may be automatically performed through a known method.

In addition, the process procedure, the control procedure, specific names, and information including various data and parameters explained in the specification and depicted in the drawings can be arbitrarily changed unless otherwise specified.

Still further, each component of each apparatus depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use.

Still further, all or arbitrary part of the process functions performed in each component can be achieved by a CPU and a program analyzed and executed on that CPU, or can be achieved as hardware with a wired logic.

EXAMPLE

Figure 5:
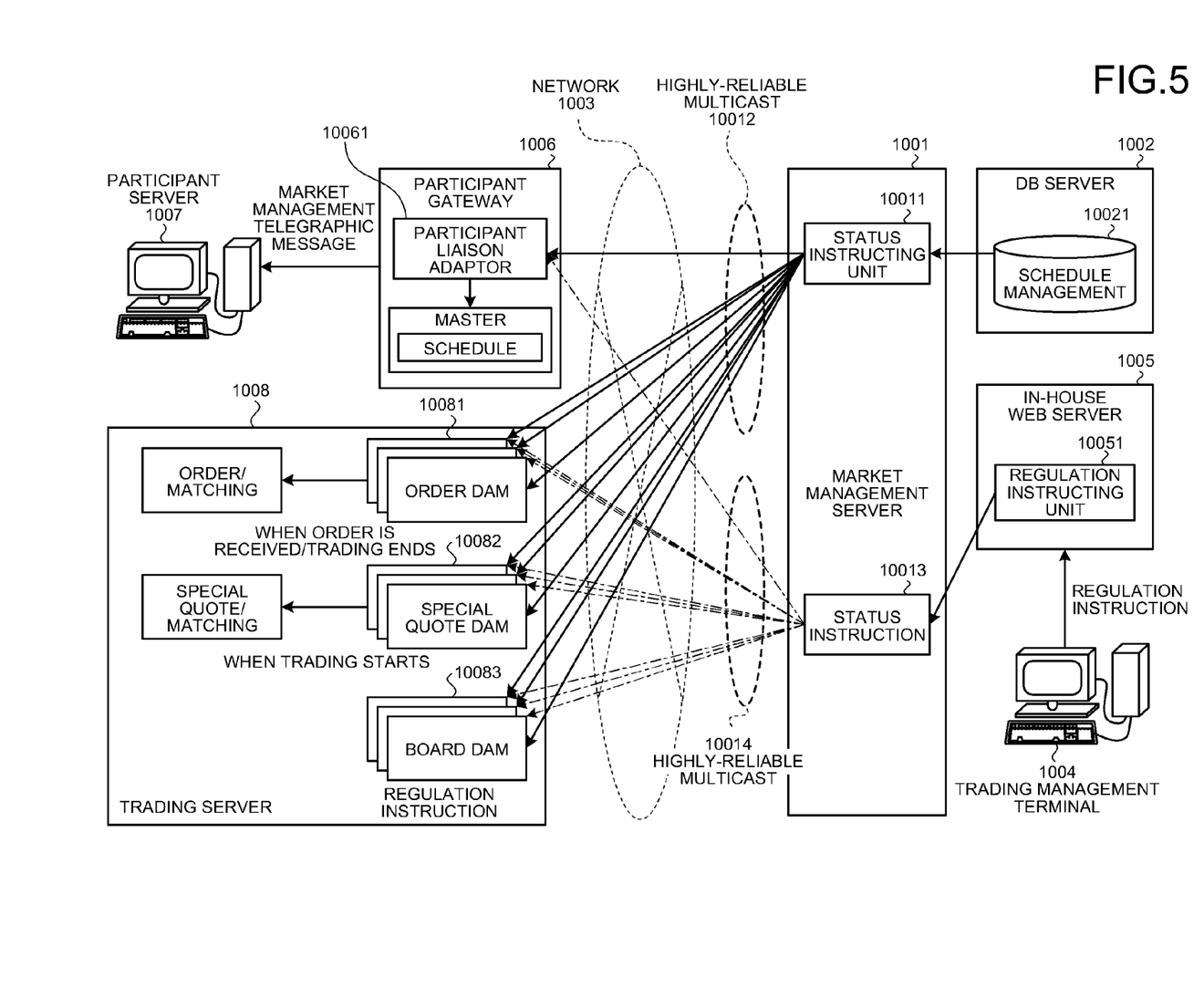
FIG. 5 is a system configuration diagram when a memory-mirroring control system according to the present invention is applied to a stock exchange system.

An example in a stock exchange system is explained below. FIG. 5 is a system configuration diagram when a memory-mirroring control system according to the invention is applied to a stock exchange system.

First, reference numeral 1001 denotes a market management server, which corresponds to the application server 20 in the embodiment explained above. In this market management server 1001, based on schedule information stored in a schedule management 10021 of a DB server 1002, a status instructing unit 10011 performs multicast communications of a status instruction through the procedure explained in the embodiment explained above via a network 1003 (in FIG. 5, referred to as highly-reliable multicast 10012).

Also, when the market management server 1001 receives regulation instruction information output from a regulation instructing unit 10051 of an in-house web server 1005 upon a regulation instruction from a trading management terminal 1004, a status instruction 10013 in the market management server 1001 performs multicast communications of the regulation instruction through the procedure explained in the embodiment above through the network 1003 (in FIG. 5, referred to as highly-reliable multicast 10014).

Reference numeral 1006 denotes a participant gateway that provides various notifications to participants in stock exchange. When a participant liaison adaptor 10061 receives information about various highly-reliable multicasts from the market management server 1001, the participant liaison adaptor 10061 determines whether a notification is to be provided to the participants. As for multicast information for which a notification is determined to be provided, that multicast information is transmitted as a market management telegraphic message to a participant server 1007.

Reference numeral 1008 denotes a trading server, including an order Durable Archive Memory (DAM) 10081, a special quote DAM 10082, and a board DAM 10083. The order DAM 10081, the special quote DAM 10082, and the board DAM 10083 are node apparatus groups depicted as the node apparatuses $10_1$, to $10_3$ by units of task group explained above.

That is, when receiving the highly-reliable multicasts 10012 and 10014 from the market management server 1001, the order DAM 10081, the special quote DAM 10082, and the board DAM 10083 each determine whether the received information relates to itself, and perform a process through the procedure depicted in FIG. 3.

In this manner, since all instructions to each DAM and participant are made through multicast transmission, an error in status-changing timing and notification timing can be minimized. Also, since the process of the trading server 1008 and notification to the participant server 1007 via the participant gateway 1006 are concurrently performed, the participants can be notified of a status change and the like at higher speed.

Furthermore, with each DAM performing the procedure of the embodiment of the present invention, a highly-reliable process can be performed at high speed.

According to an embodiment, an effect can be achieved such that the same data can be retained in a plurality of memories, thereby achieving high reliability of the in-memory database without using a disk.

Also, according to the embodiment, an effect can be achieved such that mirroring among memories can be performed without affecting a response to the transaction process performed by the application.

Furthermore, according to the embodiment, an effect can be achieved such that data stored in a memory can be updated after it is confirmed that an update log has reached all node apparatuses, thereby further increasing reliability of the in-memory database.

Still further, according to the embodiment, an effect can be achieved such that mirroring among memories can be performed only when a transaction process normally ends, thereby minimizing a range of influence when an abnormality occurs in the transaction process.

Still further, according to the embodiment, an effect can be achieved such that data update in each node apparatus can be controlled by using an update instruction distributed in a multicast manner, thereby efficiently mirroring among memories.

Still further, according to the embodiment, an effect can be achieved such that data update in each node apparatus can be controlled by using an update log distributed in a multicast manner, thereby efficiently mirroring among memories.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer readable storage medium containing instructions for controlling data mirroring among a plurality of memories, the instructions, when executed by a computer, cause the computer to perform:
   receiving an update instruction for updating data stored in a memory of an apparatus, the update instruction being generated based on a transaction process performed by an application,
   generating an update log, when the update instruction is received at the receiving, based on the update instruction, the update log indicating update contents of the data stored in the memory of the apparatus; and
   distributing the update log to other node apparatus with a memory in a multicast manner, so as to control memory-mirroring among the memories of the apparatus and the other node apparatus,
   wherein the other node apparatus discards the update instruction when the update instruction is received.

2. The non-transitory computer readable storage medium according to claim 1, wherein the instructions further causing the computer to perform real-updating the data stored in the memory based on the generated update log, asynchronously with data updating performed in the other node apparatuses based on the update log distributed in the distributing.

3. The non-transitory computer readable storage medium according to claim 2, wherein
   the real-updating includes real-updating the data stored in the memory based on the generated update log when a response is returned indicating that the update log has been received from all node apparatuses with the update log distributed thereto in the distributing.

4. The non-transitory computer readable storage medium according to claim 1, wherein
   the distributing includes distributing the update log in a multicast manner to the other node apparatuses when commit information indicating that the transaction process has been completed is transmitted from the application, and discarding the update log when an abnormality is detected in the transaction process before the commit information is transmitted.

5. The non-transitory computer readable storage medium according to claim 1, wherein the instructions further causing the computer to perform:
   receiving the update log distributed in a multicast manner;
   storing the received update log in a storage device; and
   real-updating the data stored in the memory based on the update log stored in the storing when the update instruction for updating the data is distributed in a multicast manner through the transaction process.

6. The non-transitory computer readable storage medium according to claim 1, wherein the instructions further causing the computer to perform:
   receiving the update log distributed in a multicast manner;
   storing the received update log in a storage device; and
   real-updating the data stored in the memory based on the update log already stored in the storing when the update log is received.

7. A method of controlling data mirroring among a plurality of memories using a computer, the method comprising:
   receiving an update instruction for updating data stored in a memory of an apparatus, the update instruction being generated based on a transaction process performed by an application,
   generating an update log, when the update instruction is received at the receiving, based on the update instruction, the update log indicating update contents of the data stored in the memory of the apparatus; and
   distributing the update log to other node apparatus with a memory in a multicast manner, so as to control memory-mirroring among the memories of the apparatus and the other node apparatus,
   wherein the other node apparatus discards the update instruction when the update instruction is received.

8. The method according to claim 7, further comprising real-updating the data stored in the memory based on the generated update log, asynchronously with data updating performed in the other node apparatuses based on the update log distributed in the distributing.

9. The method according to claim 8, wherein
   the real-updating includes real-updating the data stored in the memory based on the generated update log when a response is returned indicating that the update log has been received from all node apparatuses with the update log distributed thereto in the distributing.

10. The method according to claim 7, wherein
    the distributing includes distributing the update log in a multicast manner to the other node apparatuses when commit information indicating that the transaction process has been completed is transmitted from the application, and discarding the update log when an abnormality is detected in the transaction process before the commit information is transmitted.

11. The method according to claim 7, further comprising:
receiving the update log distributed in a multicast manner;
storing the received update log in a storage device; and
real-updating the data stored in the memory based on the update log stored in the storing when the update instruction for updating the data is distributed in a multicast manner through the transaction process.

12. The method according to claim 7, further comprising:
receiving the update log distributed in a multicast manner;
storing the received update log in a storage device; and
real-updating the data stored in the memory based on the update log already stored in the storing when the update log is received.

13. An apparatus comprising:
a receiving unit that receives an update instruction for updating data stored in a memory of the apparatus, the update instruction being generated based on a transaction process performed by an application;
an update-log generating unit that generates an update log, when the update instruction is received by the receiving unit, based on the update instruction, the update log indicating update contents of the data stored in the memory of the apparatus; and
a memory-mirroring control unit that distributes the update log to other node apparatus with a memory in a multicast manner, so as to control memory-mirroring among the memories of the apparatus and the other node apparatus,
wherein the other node apparatus discards the update instruction when the update instruction is received.

14. The apparatus according to claim 13, further comprising a data updating unit that real-updates the data stored in the memory based on the generated update log, asynchronously with data updating performed in the other node apparatuses based on the update log distributed by the memory-mirroring control unit.

15. The apparatus according to claim 14, wherein
the data updating unit real-updates the data stored in the memory based on the generated update log when a response is returned indicating that the update log has been received from all node apparatuses with the update log distributed thereto in the memory-mirroring control unit.

16. The apparatus according to claim 13, wherein
the memory-mirroring control unit distributes the update log in a multicast manner to the other node apparatuses when commit information indicating that the transaction process has been completed is transmitted from the application, and the memory-mirroring control unit discards the update log when an abnormality is detected in the transaction process before the commit information is transmitted.

17. The apparatus according to claim 13, further comprising:
an update-log receiving unit that receives the update log distributed in a multicast manner;
an update-log storing unit that stores the received update log in a storage device; and
a data duplicating unit that real-updates the data stored in the memory based on the update log stored by the update-log storing unit when the update instruction for updating the data is distributed in a multicast manner through the transaction process.

18. The apparatus according to claim 13, further comprising:
an update-log receiving unit that receives the update log distributed in a multicast manner;
an update-log storing unit that stores the received update log in a storage device; and
a data duplicating unit that real-updates the data stored in the memory based on the update log already stored by the update-log storing unit when the update log is received.

19. An apparatus comprising:
a memory; and
a processor that performs a process, the process including:
receiving an update instruction for updating data stored in the memory of the apparatus, the update instruction being generated based on a transaction process performed by an application,
generating an update log in response to the update instruction, the update log indicating update contents of the data stored in the memory of the apparatus, and
distributing the update log to other node apparatus with a memory in a multicast manner, so as to control memory-mirroring among the memories of the apparatus and the other node apparatus,
wherein the other node apparatus discards the update instruction when the update instruction is received.

* * * * *